April 19, 1949.    N. W. LYON    2,467,679
IN-FEED MECHANISM FOR ARTICLE HANDLING MACHINES
Filed Nov. 15, 1945    3 Sheets-Sheet 3
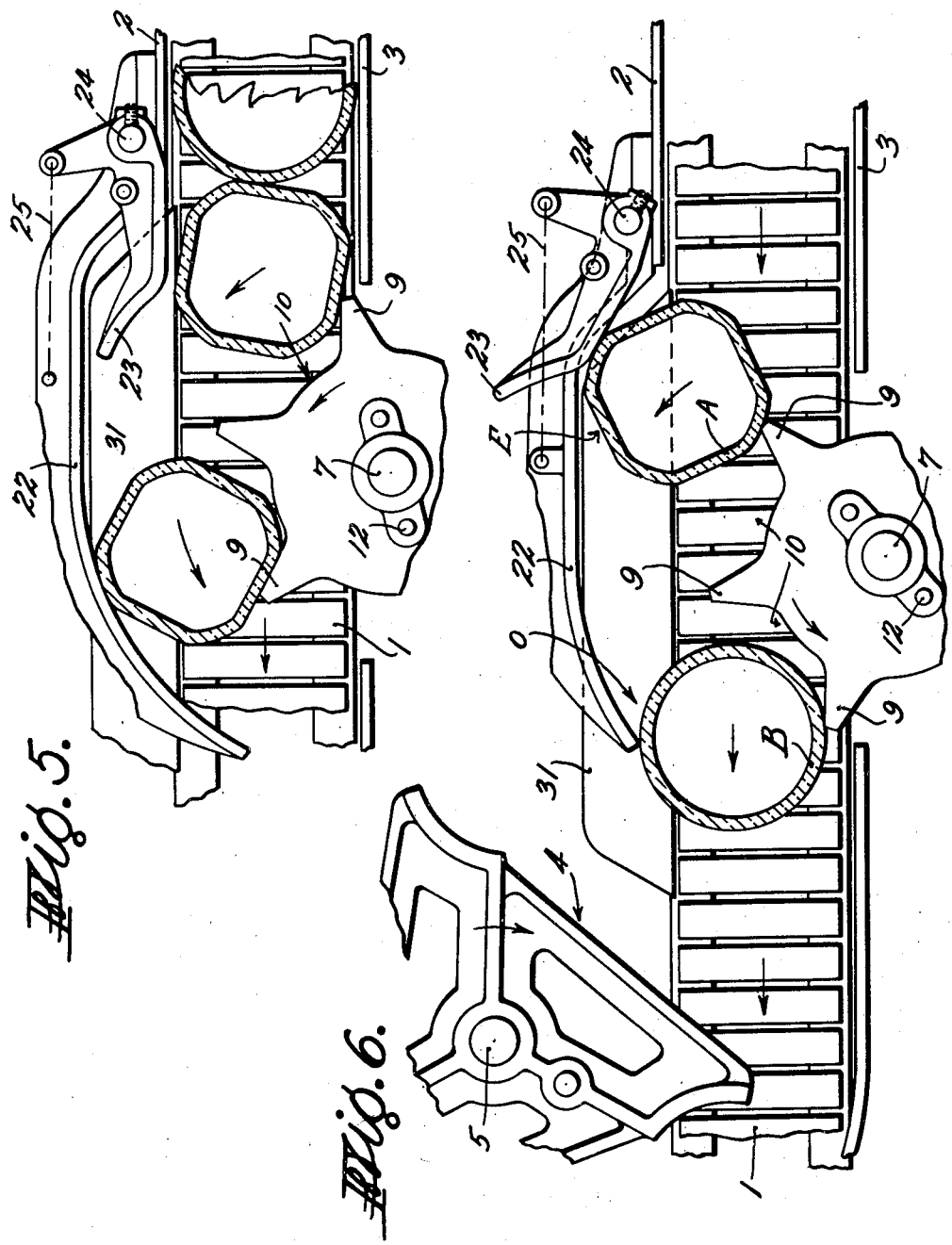
INVENTOR
NORMAN W. LYON
BY Chapin & Neal
ATTORNEYS Patented Apr. 19, 1949

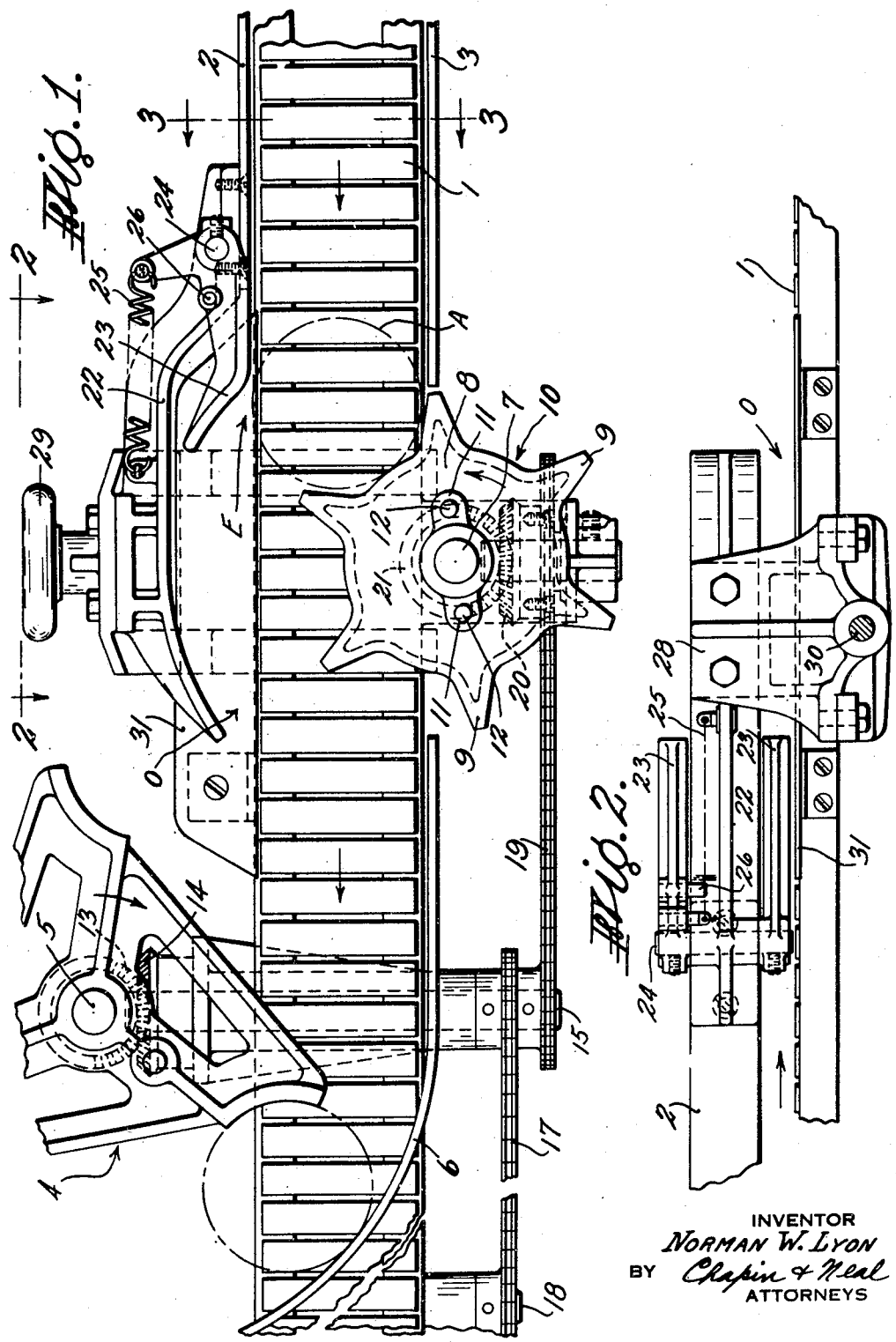

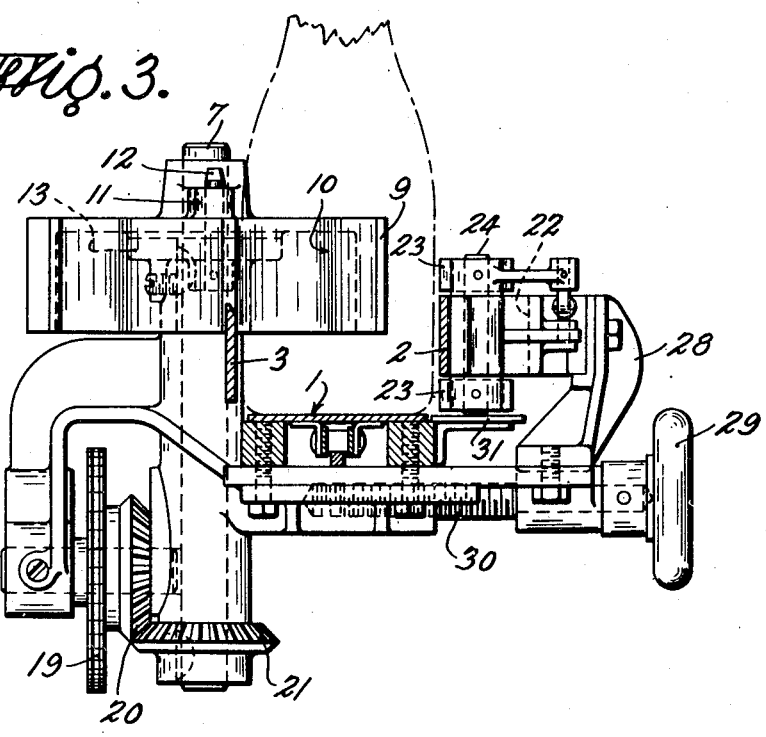
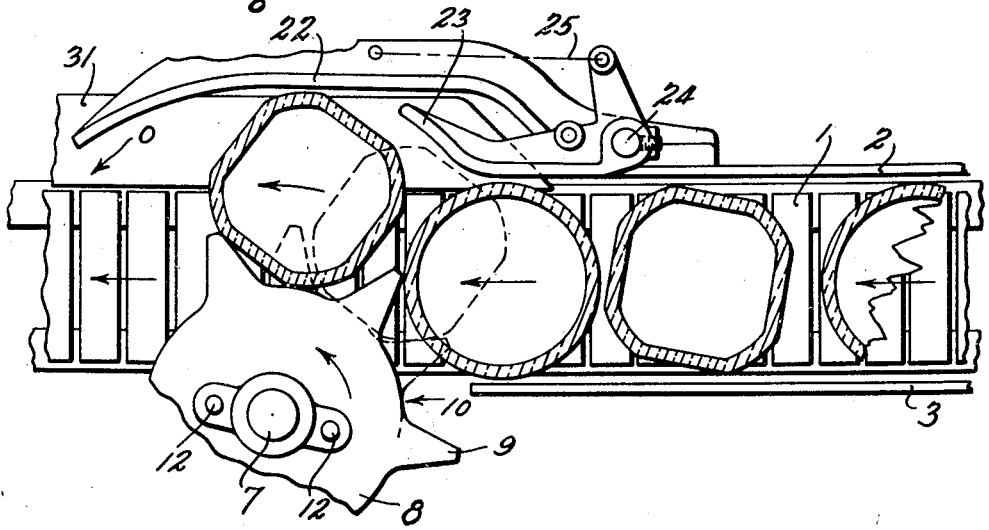

2,467,679

UNITED STATES PATENT OFFICE 2,467,679

INFEED MECHANISM FOR ARTICLE HANDLING MACHINES

Norman W. Lyon, Springfield, Mass., assignor to Package Machinery Company, Springfield, Mass., a corporation of Massachusetts Application November 15, 1945, Serial No. 628,826

5 Claims. (Cl. 198—34)

This invention relates to in-feed mechanism for article handling machines of the cyclically operated type and has for its object the feeding of articles in properly timed relation for being received by such a handling machine. In its present embodiment the invention is adapted more particularly for the in-feeding of milk bottles to an appropriate handling machine, such for instance as the bottle hooding machine shown in my previous Patent No. 2,258,185 dated October 7, 1941.

As described in said patent, the bottles are brought to the handling machine on a continuously traveling conveyor belt. The bottles are carried frictionally on the surface of said belt and may be spaced at random thereon or in a continuous column with each bottle in contact with its neighbor. The function of my improvement is to separate the bottles on said conveyor into properly spaced relation so as to feed at the right time into the cyclically operated handling machine and to accomplish this result with a minimum of jarring or disturbance to a continuous flow of bottles coming along the feed belt so as to reduce the danger of breakage of said bottles.

An object of my invention is to provide in-feed mechanism which will space and feed bottles at a higher rate of speed than is customary in machines of this character. To this end my mechanism is designed to operate without the usual escapement stop action characteristic of the construction shown in the patent referred to. On the contrary the action of the present improved mechanism tends to keep each bottle in continuous motion with merely a slowing down thereof for a controlled release at the proper time of the bottle to be received by the handling machine.

A further object of my invention is the provision of mechanism which will take care of bottles in a wide variety of shapes and size. Quart size, pint size and bottles of round, square or polygonal section may be passed through the present mechanism with equal facility. However, it is preferred to provide easily adjustable means for adapting the mechanism to the more efficient handling of any one standard size, such as a quart or pint bottle.

Referring to the drawings which show the preferred embodiment of my invention;

Fig. 1 is a plan view of a portion of the infeed conveyor showing my improved mechanism associated therewith;

Fig. 2 is a partial side view of the same looking in the direction of arrows 2—2 in Fig. 1, the hand wheel on shaft 30 being cut away;

Fig. 3 is an end section of the apparatus taken along line 3—3 of Fig. 1;

Fig. 4 is a fragmentary detail in plane to illustrate the action when the bottles enter smoothly at about the spacing of the pockets in the control wheel; and Figs. 5 and 6 are similar plan details to illustrate the action when a bottle makes an awkward entrance.

Referring more particularly to the drawings, 1 indicates the usual slat type conveyor belt which brings the bottles to the handling machine, said bottles resting in frictional contact upon the surface of the conveyor belt. Guide rails 2 and 3 are provided, one at each side of the belt for keeping the bottles in single file and in column upon said belt. The delivery end of the belt carries the bottles into the proximity of a rotating transfer member indicated at 4 which is fixed to the upper end of a rotating shaft 5. In the present embodiment the transfer member 4 is formed with three equally spaced concave faced take-off arms which act to transfer the bottles successively into the entrance of a bottle hooding machine, or other handling machine not shown. A curved guide rail 6 is mounted as shown for coaction with said transfer member. The dot and dash line circles in Fig. 1 indicate different positions of a bottle being carried along conveyor belt 1, and being taken off by the transfer member 4.

The construction so far described is analogous to that shown in my previous patent referred to. It will be appreciated that the transfer member 4 operates in cooperative timed relation with receiving platforms or elements of the handling machines and that in order for this cooperative action to occur properly the bottles must be delivered by the conveyor belt 1 to said transfer member 4 at the right speed and at the right spacing on said belt 1. Furthermore it should be understood that this cooperative action should take place irrespective of any random or irregular spacing of bottles as initially deposited on the belt 1. The present improvement has to do with the mechanism for spacing bottles on the conveyor belt 1 just prior to their being taken off by the transfer member 4.

At one side of the belt 1 near its delivery end is mounted a vertical rotating shaft 7 which carries a control wheel 8 shaped with alternate prongs 9 and pocket seats 10 about its periphery. This control wheel is detachably secured to the upper end of the shaft 7 by means of diametrically opposite socket bosses 11 which fit onto pins 12 projecting from a pin plate 13 integral with said shaft 7 (see Fig. 3). The detachability of the control wheel 8 is for the purpose of providing an easy replacement of the same by a wheel of different dimensions for action on a different size bottle. As hereinafter described, my improved mechanism may be adjusted to handle bottles of quart size, pint size, half-pint size or any other standard size as may be desired.

During the operation of the machine, the conveyor belt 1 is in continuous travel and the control wheel 8 is also in continuous rotation. The drive for said parts is taken from the vertical shaft 5 of the transfer member, said shaft 5 being operated from a motor drive in the manner shown and described in my previous patent referred to. A bevel gear 13 on shaft 5 meshes with bevel gear 14 on a horizontal shaft 15. The outer end of shaft 15 operates by sprocket and chain 17, a shaft 18 which drives the conveyor belt in the usual manner. The outer end of shaft 15 also operates by sprocket and chain 19, a bevel gear 20 which meshes with bevel gear 21 fixed to the lower end of the control wheel shaft 7.

It will be noted that a portion of the control wheel 8 overlaps the conveyor belt 1 so that the prongs 9 and pocket seats 10 thereof will come into the path of bottles being conveyed on said belt 1. At the opposite side of the conveyor belt and facing said control wheel 8 is mounted a fixed guide rail 22 so shaped that in conjunction with the control wheel 8, it defines a channel-like passage around said control wheel which is wider at the entrance thereof, marked E on the drawings, than at the outlet thereof, marked O on the drawings. The width of the entrance E of said passage is sufficient to admit a bottle coming along belt 1 when said bottle (indicated at A) is poised on the end of one of the prongs 9, whereas the outlet of said passage is only wide enough to discharge a bottle (indicated at B) when it is seated within a pocket 10 of the control wheel, all as illustrated in Fig. 6. In this manner while the bottles under all conditions of placement on belt 1, will always be admitted into said passage at its entrance E, no bottle can be discharged from the passage at O without the first having been seated in one of the pockets of the control wheel. As a result the bottles being discharged from the passage will be spaced one from the other on said belt 1 by the distance apart of the pockets 10 or a multiple thereof.

Means are provided to insure that each bottle entering the passage aforesaid will be seated eventually in one of the pockets of the control wheel. In the present embodiment this comprises a supplemental guide member 23 pivoted at 24 adjacent the entrance and extending part way along the passage in front of the guide rail 22 as shown in Fig. 1. A biasing spring 25 normally tends to move said guide member inwardly of the passage and a stop pin 26 on said guide member engages a flange on the guide rail 22 to limit the inward position of said guide member 23. The latter is shown at its inner-most position in Fig. 1, and the dot and dash circle in this view indicates the position of a bottle seated in the pocket of the control wheel. It will be observed from this view that the guide member 23 in its innermost position serves to confine the entrance of the passage to a width just sufficient to admit a bottle when seated in the pocket of the control wheel.

Inasmuch as bottles may be spaced at random on belt 1 it cannot be expected that every bottle will be properly timed to ride into a pocket of the control wheel 8 as shown in Fig. 1. In some cases a bottle will come up against the end of one of the prongs 9 of said control wheel as indicated at A in Fig. 6. In this event the bottle will continue to move into the passage and as it does so the supplemental guide member 23 will yield outwardly while applying a wiping pressure to the bottle so as to roll it or press it into one of the pockets of said control wheel. In some cases the bottle might be pushed into a forward pocket and in some cases it might be pushed into a rearward pocket with respect to the prong on which it is poised. The action, however, will not abruptly interrupt a continuous flow of the bottles coming along the belt 1, but on the contrary will allow practically a continuous admission of bottles into the passage accompanied when necessary by the function of the supplemental guide member 23 in seating the bottle into one of the pockets of said control wheel.

The drive for the belt 1 is arranged to give a linear speed to the same, slightly faster than the rotational pocket speed of the control wheel 8 whereby the bottles on the belt 1 are continuously striving to move out of the passage faster than the control wheel will allow the same. In this manner the discharge of each bottle from the passage is controlled by the prongs of the control wheel as illustrated in Fig. 6. Also the transfer member 4 is operated so that its take-off arms will move across the conveyor belt at slightly faster speed than the travel of said conveyor belt whereby the bottles are smoothly taken off said belt and transferred to the handling machine.

In order to provide for adjustment of the apparatus to different sized bottles, viz. quart, pint or half-pint size, the fixed guide rail 22 together with its supplemental guide member 23 are carried on a bracket 28 which is adjustable inwardly and outwardly from the side of the conveyor belt by means of hand wheel 29 and screw shaft 30 (see Fig. 3). 31 indicates a fixed shelf at one side of the conveyor belt beneath the guide rail 22. As shown in Fig. 3, this shelf 31 is on a level with the belt 1, to provide support for the bottles as they are being carried around the control wheel.

What I claim is:

1. In-feed mechanism for article handling machines comprising in combination, a continuously traveling conveyor belt upon which articles are frictionally carried, a continuously rotating control wheel mounted at one side of the belt for spacing articles, said control wheel having alternate prongs and pockets positioned in the path of articles carried on said belt, means in conjunction with said control wheel defining a channel-like passage for said articles which is wider at its entrance than at its outlet, the entrance being of sufficient width to admit an article poised on the end of a prong of said control wheel and the outlet being of sufficient width to discharge an article only when seated in a pocket of said control wheel, spring actuated means movably mounted at the entrance of said passage and normally tending to assume a position which confines the width of said entrance to the admission of an article seated in a pocket of said control wheel and arranged to yieldingly give way a sufficient amount for the admission of an article poised on the end of a prong of said control wheel, said spring actuated means having a wiping action against an article poised on said prong and tending to seat said article into one of the adjacent pockets of said control wheel so that said article will be discharged under the control of said wheel.

2. In-feed mechanism for article handling machines comprising in combination, a continuously traveling conveyor belt upon which articles are frictionally carried, a continuously rotating control wheel mounted at one side of said belt for spacing articles while being carried forward on said belt, said control wheel being peripherally formed with alternate prongs and pockets positioned partway across the width of said belt and in the path of articles carried on said belt, means in conjunction with said control wheel defining a channel-like passage for said articles which is wider at its entrance than at its outlet, the entrance being of sufficient width to admit an article poised on the end of a prong of said control wheel and the outlet being of sufficient width to discharge an article only when seated in a pocket of said control wheel, spring actuated means movably mounted at the entrance of said passage and normally tending to assume a position which confines the width of said entrance to the admission of an article seated in a pocket of said control wheel and arranged to yieldingly give way a sufficient amount for the admission of an article poised on the end of a prong of said control wheel, said spring actuated means having a wiping action against an article poised on said prong and tending to seat said article into one of the adjacent pockets of said control wheel so that said article will be discharged under the control of said wheel.

3. In-feed mechanism for article handling machines comprising in combination, a continuously traveling conveyor belt upon which articles are frictionally carried, a continuously rotating control wheel mounted at one side of the belt for spacing articles, said wheel having alternate prongs and pockets positioned in the path of articles carried on said belt, means in conjunction with said control wheel defining a channel-like passage for said articles which is wider at its entrance than at its outlet, the entrance being of sufficient width to admit an article poised on a prong of said control wheel and the outlet being of sufficient width to discharge an article only when seated in a pocket of said control wheel, means at the entrance of said passage in position to engage an entering article and insure by yielding pressure thereon the seating of said article in a pocket of said control wheel so that said article will be discharged under control of said wheel, means for operating said conveyor belt at slightly faster linear speed than the discharge feed of said control wheel, and a continuously rotating transfer member for taking off articles from said conveyor belt after being discharged by said control wheel and means operating said transfer member at a slightly faster take-off speed than the linear speed of said belt.

4. In-feed mechanism for article handling machines comprising in combination, a continuously traveling conveyor belt upon which articles are frictionally carried, a continuously rotating control wheel mounted at one side of the belt for spacing articles, said wheel having alternate prongs and pockets positioned in the path of articles carried on said belt, a fixed guide rail facing said control wheel for defining therewith a channel-like passage which is wider at its entrance than at its outlet, the entrance being of sufficient width to admit an article poised on the end of a prong of said control wheel and the outlet being of sufficient width to discharge an article only when seated in a pocket of said control wheel, and a supplemental guide member movably mounted at the entrance of said passage and spring biased in position to normally confine the width of said entrance to the admission of an article seated in a pocket of said control wheel and arranged to yieldingly give way a sufficient amount for the admission of an article poised on the end of a prong of said control wheel, said spring actuated guide member having a wiping action against an article poised on said prong and tending to seat said article into one of the adjacent pockets of said control wheel so that said article will be discharged under the control of said wheel.

5. In-feed mechanism for article handling machines comprising in combination, a continuously traveling conveyor belt upon which articles are frictionally carried, a continuously rotating control wheel mounted at one side of the belt for spacing articles, said wheel having alternate prongs and pockets positioned in the path of articles carried on said belt, a fixed guide rail facing said control wheel for defining therewith a channel-like passage which is wider at its entrance than at its outlet, the entrance being of sufficient width to admit an article poised on a prong of said control wheel and the outlet being of sufficient width to discharge an article only when seated in a pocket of said control wheel, and a supplemental guide member pivotally mounted at the entrance of said passage and extending in front of said fixed guide rail, toward the outlet, a spring to bias said guide member inwardly of the passage, a stop abutment for limiting said inward movement to a position whereby said guide member normally confines the width of said entrance to the admission of an article seated in a pocket of said control wheel, said guide member acting with yielding pressure on an article poised on a prong of said control wheel to seat said article into a pocket of said control wheel.

NORMAN W. LYON.

REFERENCES CITED

The following references are of record in the file of this patent:

UNITED STATES PATENTS

| Number | Name | Date |
|---|---|---|
| 1,023,074 | Gaynor et al. | Apr. 9, 1912 |
| 1,528,544 | Hauger | Mar. 3, 1925 |
| 1,957,534 | Gladfelter | May 8, 1934 |
| 2,308,154 | Carter | Jan. 12, 1943 |